April 9, 1957
C. T. MILLER
2,788,124
SORTING APPARATUS
Filed March 19, 1952
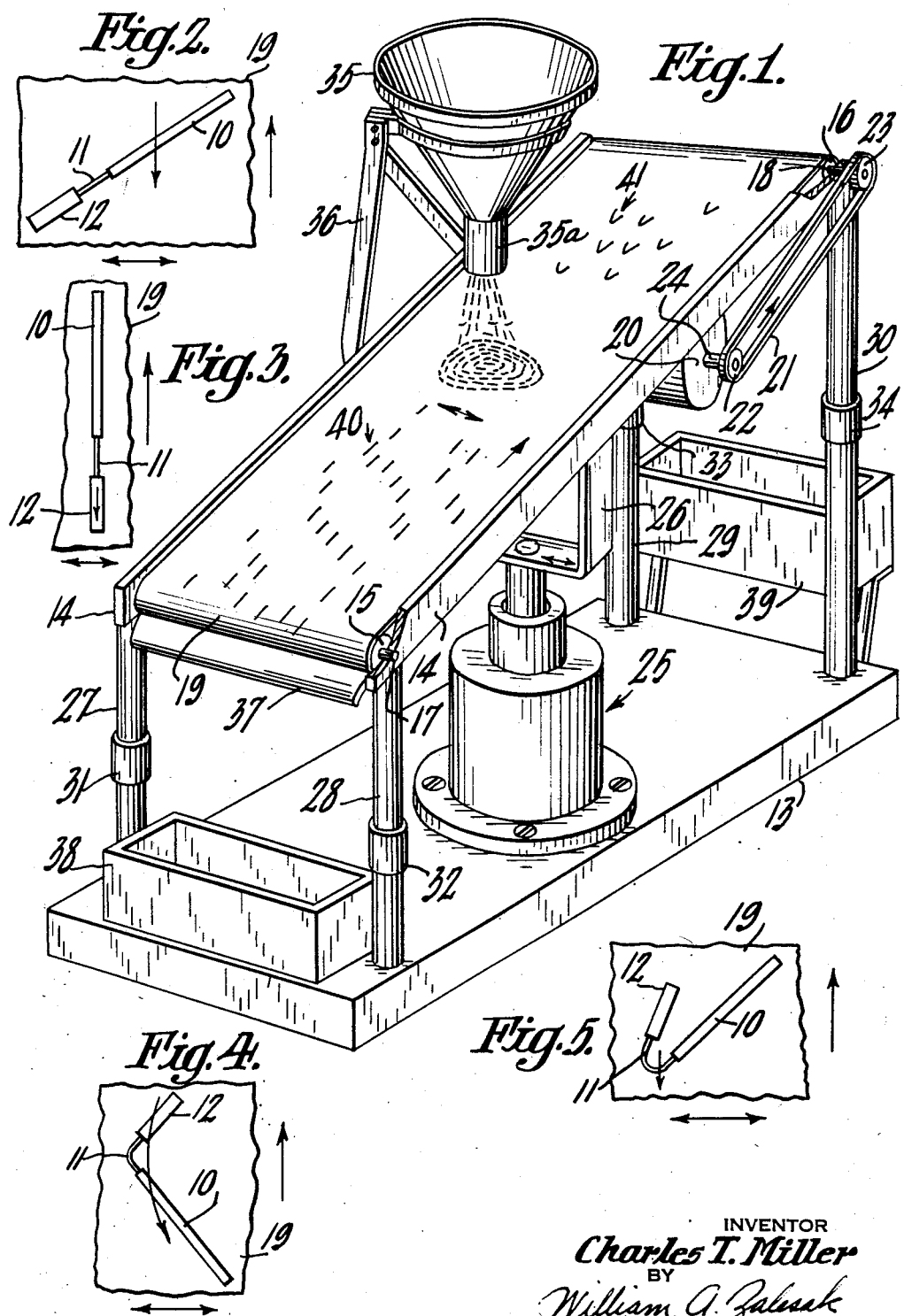
INVENTOR
Charles T. Miller
BY
William A. Zalesak
ATTORNEY

United States Patent Office 2,788,124
Patented Apr. 9, 1957

2,788,124

SORTING APPARATUS

Charles Thurber Miller, East Orange, N. J., assignor to Radio Corporation of America, a corporation of Delaware Application March 19, 1952, Serial No. 277,478

7 Claims. (Cl. 209—114)

This invention relates to a sorting apparatus and more particularly to an apparatus for separating bent wire units from straight wire units.

The wire units when in the form of composite lead-ins for electron tubes are relatively weak at their intermediate portions due to a relatively small diameter of the composite parts thereof. Therefore, the wire units may become bent easily at such intermediate portions thereof.

The lead-in units referred to are relatively costly and it is therefore desirable to salvage the straight units from the rejected units referred to, for re-use. Heretofore, the salvaging operation has involved a manual picking of the straight units from the receptacle in which they are collected with bent units. Due to the relatively small size of the units, this manual operation is tedious, involves appreciable eye strain, and is expensive in operator time.

Accordingly, it is an object of the invention to provide an apparatus for automatically and quickly segregating straight wire units from bent wire units.

A further aim of the invention is to provide a sorting apparatus for separating readily bendable straight wire units from bent wire units without bending the straight units.

Another purpose of the invention is to provide an apparatus for sorting composite lead-ins having a relatively massive end, wherein said relatively massive end orients straight units differently from bent units for separating said straight units from the bent ones.

A further end sought by the invention is the provision of a sorting apparatus for separating straight wire units from bent units and which automatically provides paths of reduced resistance to travel for straight units and provides paths of increased resistance to travel for bent units, whereby said straight and bent units are directed to different locations for collection.

Another purpose of the invention is to provide an apparatus for urging straight wire units in one direction and bent wire units in another direction for separating said straight units from bent ones.

A further object of the invention is to provide a sorting apparatus having a horizontally inclined and upwardly moving conveyor for vibrationally orienting straight wire units only in parallel relation to each other and to the direction of travel of the conveyor, whereby frictional resistance to travel of the straight units is reduced and said units are adapted to travel downwardly on the conveyor to a receiving location, said conveyor carrying upwardly bent units having greater frictional resistance to travel to a receiving location spaced from the first-named receiving location.

In accordance with one embodiment of the invention, an endless belt is supported in a plane inclined from the horizontal. Means are provided for moving the belt so that the upper surface thereof moves upwardly in said inclined plane. Means are also provided for vibrating the belt in movements transversely of its direction of travel. A receptacle or bin is provided at each end of the belt for receiving wire units spilling over the ends of the belt.

In operation, a group of straight and bent wire units, such as composite lead-ins aforementioned, may be deposited on the upper surface of the belt and at a location thereon intermediate its ends. The vibrations and inclination of the belt will cause the straight units to align themselves in the direction of travel of the belt and transversely to the vibrating movements thereof. The vibrations referred to reduce the frictional engagement between the straight units and the surface of the belt, so that the units in response to gravity and the inclination of the belt become disposed with their more massive ends extending towards the lower end of the belt. The vibrations referred to also reduce resistance to travel of the units downwardly along the belt. Such resistance is further reduced by the alignment of the straight lead-ins in the direction of travel of the belt. As a result of this dual reduction in resistance to travel, the straight lead-ins are free to respond to the urge of gravity and in consequent movement towards the lower end of the belt where they spill over and are collected by one of the receptacles referred to.

The bent lead-ins, on the other hand, are incapable of alignment in the direction of travel of the belt. Therefore their resistance to movement with respect to the belt is appreciably greater than that of the straight lead-ins. As a consequence, the bent lead-ins follow the travel of the belt upwardly in the inclined plane referred to, and are spilled over the upper end of the belt and into the other of the receptacles referred to.

Further objects and features of the invention will become manifest from the following and more detailed description of an embodiment thereof taken in connection with the appended drawings in which Figure 1 is a perspective view of one embodiment of the apparatus of the invention;

Figure 2 is a fragmentary view of the belt of the apparatus shown in Figure 1 and depicts a straight lead-in structure immediately after deposit on the belt;

Figure 3 is a view similar to that of Figure 2, and shows the aligned position of the straight lead-in structure shortly after deposit on the belt;

Figure 4 is a view similar to that of Figure 2, except that a bent lead-in structure is shown immediately after deposit on the belt; and Figure 5 is a view similar to that of Figure 4, except the bent lead-in structure is depicted in a position after it has been acted on by the vibrations and inclination of the belt.

Referring now to the drawing in more detail, there is shown in Figure 1 an apparatus that may have utility, for example, in sorting a random supply of straight and bent composite lead-ins used in miniature type electron tubes.

Each of such lead-ins, as shown in Figure 2, may comprise wire sections 10, 11, 12 welded together. The wire section 10 is 15 millimeters long and has a diameter of 20 mils. Wire section 11 is a composite body, having a core of steel, for example, and an outer coating of copper, and may have a length of 2.5 millimeters and a diameter of 16 mils. Wire section 12 is 8 millimeters long and has a diameter of 40 mils. Wire sections 10 and 12 may be made of nickel.

It will be noted from the foregoing that wire section 12 is appreciably more massive per unit of length than either wire section 10 or 11. Therefore, the end portion of the lead-in structure including wire section 12 is much heavier than the opposite end portion thereof. This feature is important in connection with the apparatus of the invention as will appear more clearly in the following.

An apparatus embodying the invention may include a base 13 on which is supported an endless belt unit including a frame 14, spaced rollers 15, 16 mounted for rotation on shafts 17, 18 journaled in the frame 14, and an endless belt 19 engaging the rollers referred to and made of a material such as rubber having a dull or slightly rough surface.

The endless belt unit may be connected to a power source such as a motor 20 mounted on frame 14 by a power transfer means such as belt 21 engaging pulleys 22, 23 fixed to motor shaft 24 and roller shaft 18, respectively, for causing the upper portion of the belt between rollers 15, 16 as viewed in Figure 1, to move to the right at a velocity of about one foot per minute. The endless belt unit referred to may also be connected to a vibrator 25 by means of a bracket 26. The vibrator referred to is adapted to produce short movements transversely of the belt 19 of about ¾ inch long at a frequency of about 150 cycles per minute. Such movements are transmitted to the belt through bracket 26 and frame 14 to which the bracket is fixed. Vibrators of this type are well known in the trade. Thus, one available type of electrically energized vibrator is known as the "Syntron" vibrator. In view of the commercial availability of vibrators of the type of vibrator 25, aforementioned, further description thereof herein is believed unnecessary.

The endless belt unit is supported by legs 27, 28, 29, 30 fixed to the frame 14 and resting on base 13. Legs 29, 30 are longer than legs 27, 28 so that the upper surface of endless belt 19 is disposed in an inclined plane. This plane may be inclined from the horizontal from 5 to 12°. However, for sorting composite lead-ins of the type described, the belt surface referred to is preferably inclined about 8° from the horizontal.

To render the mounting of the endless belt unit resilient, so that it may respond in vibrating movements to the vibrator 25, the legs referred to may include two parts joined by resilient bushings or couplings 31, 32, 33, 34, which may be made of rubber.

A group of straight and bent lead-ins may be manually deposited on the upper surface of endless belt 19 intermediate its ends. However, it is preferred to use a funnel or feeding means 35 known in the trade as a Syntron, fixed to frame 14 by a bracket 36 and having a restricted issuing end 35a in registry with a portion of the endless belt intermediate its sides and ends.

Aprons may be provided at the ends of the endless belt unit, one of which is shown at 37, for directing spilled lead-ins into bins or receptacles 38, 39.

The apparatus of the invention may have any desired size. For example, an apparatus having an endless belt 10 inches wide mounted on rollers spaced one foot has been found suitable in practice.

The straight lead-in units 40 orient themselves in one position on endless belt 19 and bent lead-ins 41 orient themselves in another position on the belt, as will be apparent from the following description of the operation of the apparatus.

In operation, motor 20 and vibrator 25 are energized, to cause the endless belt 19 to move on rollers 15, 16 so that the portion of the belt between the upper surfaces of the rollers moves upwardly in the plane of inclination of the belt as indicated by the upwardly pointed arrows, and to cause the belt to vibrate in directions parallel to rollers 15, 16 as indicated by the doubly pointed arrows.

A group of straight and bent lead-ins 40, 41, deposited on the belt, through funnel 35, will be acted on by the motions of the belt, in such a manner that the straight lead-ins will move to one end of the belt and the bent lead-ins will move to the other end of the belt. More specifically, a straight lead-in 40 when first engaging the belt may be in the position shown in Figure 2. When in this position, two forces act upon it. One force is gravity indicated by a downwardly pointed arrow in response to which the lead-in tends to dispose its heavier end portion 12 in a lower position than that of its lighter end 10. Movement of the lead-in in response to this force is aided by the inclination of the belt, as a consequence of which the lead-in is urged downwardly along the belt with its heavier end 12 leading. The other force is manifested in the form of movement of the belt on rollers 15, 16 and tending to move the lead-in upwardly. If there were no friction between the lead-in and the belt, the lead-in would respond to the first-named force and spill out at the lower end of the belt. However, in such case, the bent lead-ins would respond in a similar manner and both bent and straight lead-ins would spill over the same end of the belt and no sorting thereof would be accomplished.

Therefore, the apparatus of the invention tolerates some friction between the lead-ins 40, 41 and the endless belt 19. It has been found that friction between straight lead-ins aligned with the direction of travel of the belt is less than that between bent lead-ins and the belt, due to the fact that such bent lead-ins cannot be aligned with the direction of travel referred to. Therefore, the friction between the belt and lead-ins provided by the apparatus of the invention, is less than that required to fully restrain movement of the straight lead-ins on the belt, and greater than that required to fully restrain such movement of the bent lead-ins. Consequently, the frictional opposition to travel on the belt of straight lead-ins is less than the force of gravity thereon, so that straight leads-ins travel to the lower end of the belt and are collected by bin 38. However, the bent lead-ins are frictionally restricted against movement to a greater degree than the force of gravity thereon, so that they follow the belt upwardly and are spilled into bin 39.

The vibrating movements of the belt 19 on which the lead-ins are deposited reduces the friction between the belt and lead-ins referred to. This reduction in friction is of such value that in response to the force of gravity thereon, straight lead-ins are aligned with the direction of travel of the belt on rollers 15, 16 with their heavier ends 12 extending towards the lower end of the belt.

Further reduction in friction between the straight aligned lead-ins and the belt surface occurs. As has been indicated before herein, the surface of the belt on which the lead-ins are deposited is relatively rough. A sliding movement of an object such as a lead-in along this surface involves some, although slight, deformation of surface irregularities therein. This deforming action absorbs some of the force urging the object to move on the surface. However, where the object is elongated, and aligned in the direction of normal travel of the belt and in the direction of declination of the belt, only a relatively narrow strip of the belt surface is traversed by the object and consequently a relatively small number of irregularities in the surface are encountered by the object, with corresponding reduction in opposition to movement of the object.

The reduction in friction and opposition to motion as aforementioned are such, under the conditions referred to, that the force of gravity acting on a straight and aligned lead-in is adequate to cause the lead-in to slide on the belt surface against the direction of travel of the belt and at a faster rate than the movement of the belt, until it spills over the lower end of the belt as aforementioned.

While the vibration of the belt also reduces the friction between bent lead-ins and the belt surface on which they are deposited, this reduction alone is inadequate to permit the bent lead-ins to slide downwardly on the belt. Bent lead-ins, it will be appreciated, require a relatively wide path on the belt surface for movement thereon. Such wide path causes the lead-ins to engage a relatively larger number of the irregularities in the belt surface. Such engagement under the conditions mentioned is sufficient to prevent sliding movement of the bent lead-ins on the belt surface. Consequently, bent lead-ins are carried by the belt to its upper end from which they are spilled into bin 39.

While the operation of the apparatus has been described in relation to composite lead-ins used in miniature electron tubes, it may also have utility in sorting wires or lead-ins of one piece construction having a uniform thickness throughout their lengths. When so used, the vibrations of the endless belt continuously changes the axial orientation of straight lead-ins. During such changes in orientation, straight lead-ins will become aligned with the direction of travel of the belt, and move towards the lower end of the belt if only for a relatively short time. However, during a plurality of such times, the lead-ins or wires so aligned will travel the full distance to the lower end of the belt and will spill over into bin 38. Bent wires or lead-ins on the other hand will never become aligned with the direction of travel of the belt, and accordingly, they will be carried to the upper end of the belt from which they will fall into bin 39.

It will then be apparent from the foregoing that a novel and advantageous apparatus is provided for sorting relatively small objects. The apparatus finds particular utility in sorting straight lead-ins from a random supply of straight and bent lead-ins, thus permitting the straight lead-ins to be re-used. The apparatus of the invention moreover accomplishes a sorting operation with greater speed than possible in a manual operation. Furthermore, the sorting operation is effected by the apparatus with reduced hazard of bending straight leads. The apparatus of the invention therefore introduces an appreciable economy in the manufacture of electron tubes having lead-ins of the type described.

What is claimed is:

1. A sorting apparatus for sorting wire units having one end heavier than the other, comprising two spaced parallel rollers having horizontal axes disposed in a plane inclined 5 to 12° from the horizontal, an endless belt engaging said rollers, said belt including an upper portion disposed in a plane said upper portion having an outer surface irregularly roughened substantially to dullness, parallel to said inclined plane, means engaging one of said rollers for rotating the same and to cause said upper portion of the belt to move upwardly in said plane, a support for said rollers, and means engaging said support for vibrating said belt transversely of its upward movement and in said plane, whereby said apparatus is adapted to direct bent and straight wire units deposited on said portion of the belt to different locations for sorting straight units from bent units.

2. A sorting apparatus for sorting straight wire units from bent wire units, wherein each of said units comprises a composite structure and includes one end portion 15 millimeters long and 20 mils in diameter, another end portion 8 millimeters long and 40 mils in diameter and an intermediate portion 2.5 millimeters long and 16 mils in diameter, said apparatus comprising an endless belt, means engaging said belt for disposing a portion of said belt in a plane inclined about 8° from the horizontal, means connected to said belt for moving said portion of the belt upwardly in said plane, means connected to said belt for vibrating said belt in said plane at a frequency of about 150 cycle per minute transversely of the upward movement of said portion of the belt, means adjacent said portion for feeding straight and bent wire units to the outer surface of said portion, said outer surface being irregularly roughened to dullness, whereby said straight units are aligned in the direction of upward movement of said portion for reduced friction and are adapted to slide to the lower end of said portion and said bent wire units extend across said direciton for increased friction and are carried to the upper end of said portion, and spaced means adjacent said lower end and upper end of said portion adapted to receive said wire units delivered thereto.

3. A sorting apparatus for separating straight and bent wire units having one end thereof heavier than the other end thereof, said apparatus comprising an endless belt, means engaging spaced transverse portions of said belt, for disposing a portion of said belt in a plane inclined 5 to 12° from the horizontal, means connected to said first-named means for moving said portion of the belt upwardly in said plane at a rate of about one foot per minute, means supporting said engaging means, means connected to said supporting means for vibrating said portion of the belt in movements transversely thereto in said plane and about ¾ inch long and at a frequency of about 150 cycles per minute, said belt portion having an outer surface irregularly roughened to dullness, whereby straight wire units deposited on said belt are aligned in the direction of travel of said portion for reduced friction therewith and slide to the lower end of said portion, and bent wire units extend across said direction for increased friction with said outer surface and are carried to the upper end of said portion.

4. A sorting apparatus for separating bent wire units from straight wire units wherein said units have one end thereof of greater weight than the other end, said apparatus comprising two parallel rollers having axes disposed in a plane inclined 5 to 12° from a horizontal plane, a belt having an irregularly roughened dull rubber surface and mounted for endless travel on said rollers and having upper and lower courses, means connected to said rollers for vibrating said belt in movements longitudinally of said rollers, and means for rotating one of said rollers to cause the upper course of said belt surface to travel upwardly in a plane parallel to said plane, whereby said belt is adapted to carry bent wire units to its upper end and to provide a sliding surface for straight wire units to the lower end of said belt, for separating said units.

5. A salvaging apparatus for salvaging straight wire units from a random supply of straight and bent wire units, said apparatus comprising an endless belt structure having an upper and a lower course, said belt having an outer surface roughened to dullness, means engaging said belt for supporting said belt to dispose the ends of said structure in vertically spaced horizontal planes, whereby said upper course lies in an inclined plane, means connected to said belt for moving said upper course upwardly in said inclined plane, means engaging said supporting means for vibrating said upper course in movements confined to said inclined plane and transversely to the direction of travel of said upper course, and means mounted above the outer face of said upper course and intermediate the ends of said structure for loading said random supply of units on said outer face, whereby random bent and straight units simultaneously loaded on said outer face are sorted and carried to opposite ends of said structure for substantially simultaneous delivery by said structure.

6. A sorting apparatus for separating straight wire units from bent wire units, comprising an endless belt having a course mounted for travel upwardly in an inclined plane, means engaging said course for vibrating the same in said inclined plane and transversely of the direction of said travel, and means supported above said upper course and substantially midway between the ends of said course for feeding a random supply of said straight and bent wire units to said upper course, said upper course having an outer surface irregularly roughened to dullness, whereby bent and straight wire units simultaneously fed to said upper course are carried to opposite ends of said course and ejected substantially simultaneously by said course.

7. A sorting apparatus for separating straight wire units from bent wire units, comprising an endless belt having a course mounted for travel in an inclined plane, whereby one end of said course is higher than the other, the outer face of said course comprising rubber roughened to dullness, a funnel mounted above said course for delivering a random supply of said straight and bent wire units to the outer face of said course, means connected to said belt for moving said course towards said higher end thereof, whereby the said bent units are carried to the upper end of said course by frictioned engagement with said outer face, and means for vibrating said course in said inclined plane and normal to the direction of travel of said course, whereby said straight units are aligned with said direction of travel for reducing the frictional engagement with said outer face and are caused to travel to the lower end of said course, said funnel being disposed substantially midway between the ends of said course, whereby straight and bent units simultaneously fed to said course are carried to opposite ends of said course for substantially simultaneous delivery thereby.

References Cited in the file of this patent

UNITED STATES PATENTS

| | | |
|---|---|---|
| 655,161 | Poorbaugh | July 31, 1900 |
| 906,280 | Phillips | Dec. 8, 1908 |
| 931,991 | Brooks et al. | Aug. 24, 1919 |
| 1,094,621 | Ayres | Apr. 28, 1914 |
| 2,299,298 | Bignell | Oct. 20, 1942 |
| 2,318,976 | Stevens | May 11, 1943 |
| 2,358,506 | Guthrie et al. | Sept. 19, 1944 |
| 2,615,567 | Campbell | Oct. 28, 1952 |